Dec. 4, 1934.   F. E. CARDULLO   1,982,856
MECHANISM FOR CONTROLLING THE MOVEMENTS OF
A HEAD OR CARRIAGE OF A MACHINE TOOL
Filed Sept. 29, 1932   3 Sheets-Sheet 2

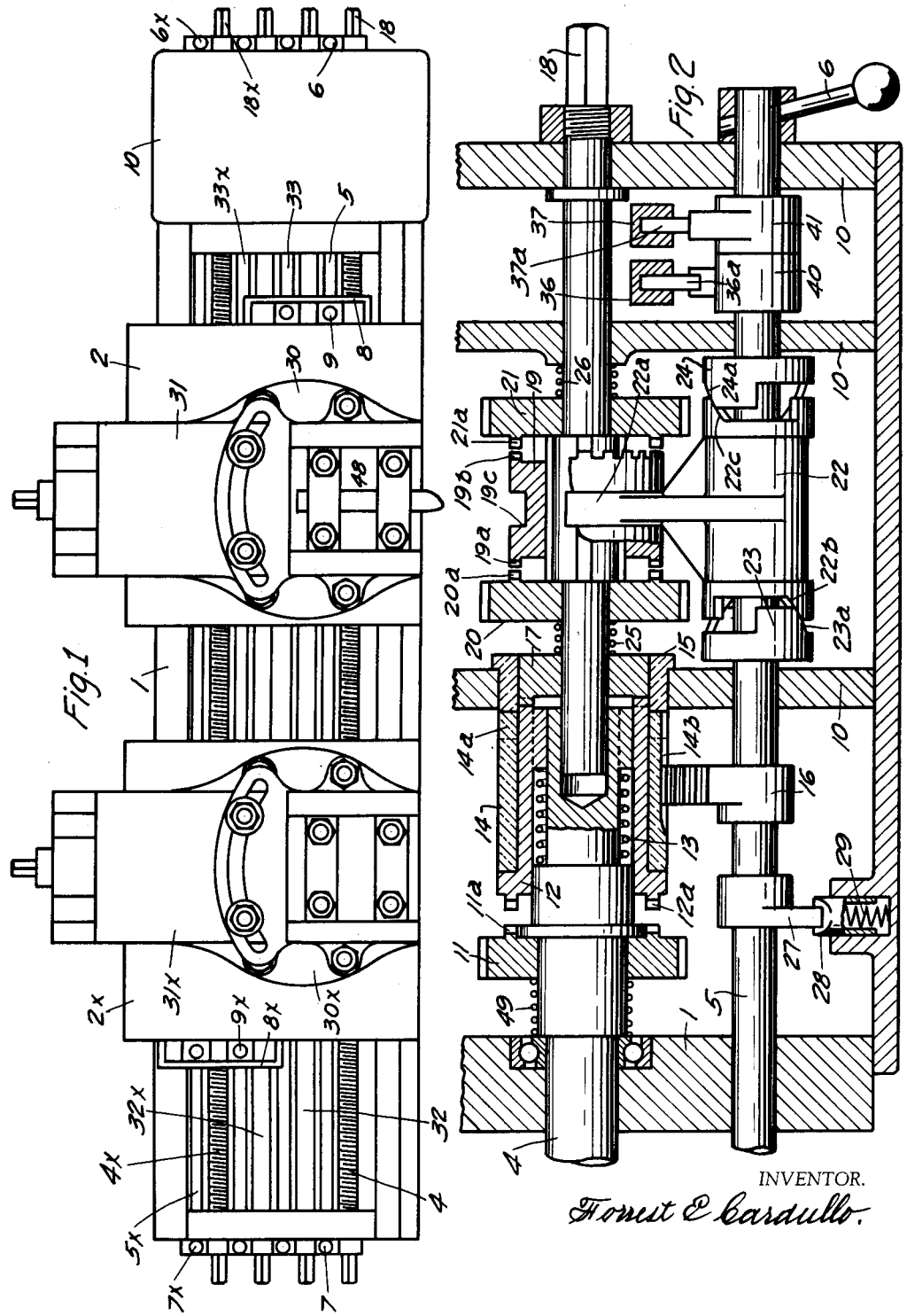

INVENTOR.
Forrest E Cardullo.

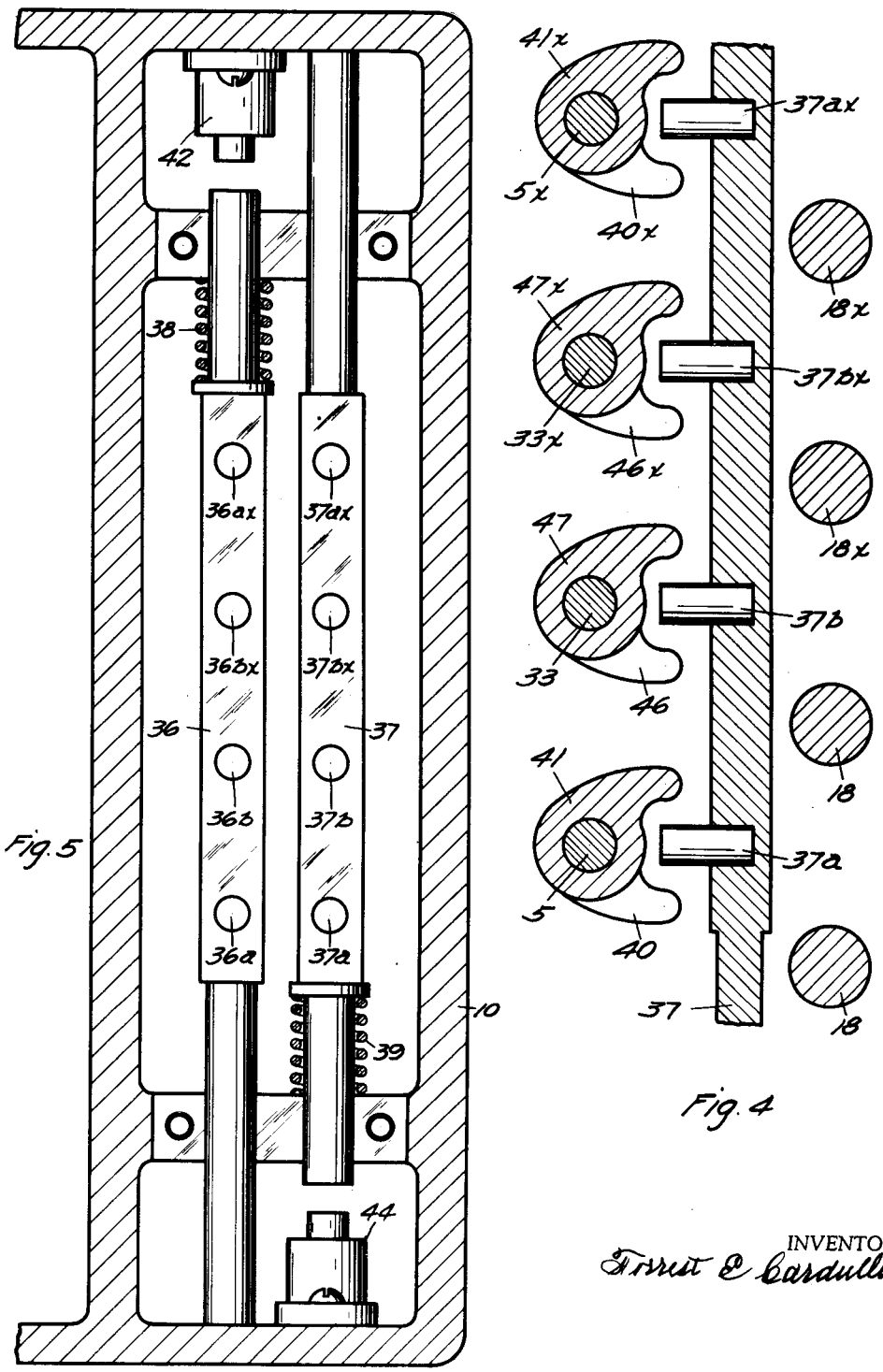

Patented Dec. 4, 1934

1,982,856

UNITED STATES PATENT OFFICE 1,982,856

MECHANISM FOR CONTROLLING THE MOVEMENTS OF A HEAD OR CARRIAGE OF A MACHINE TOOL

Forrest E. Cardullo, Cincinnati, Ohio, assignor to The G. A. Gray Company, Cincinnati, Ohio Application September 29, 1932, Serial No. 635,433

18 Claims. (Cl. 90—37)

My improvement relates particularly to that class of machine tools known as planers, but is adapted to control the tool holding or work holding element of other types of machine tools when it is desirable to give feed or rapid traverse movement to the said element.

The object of my invention is to control the movement of the element to be fed, hereafter termed the head, along a guiding support, by means of a control shaft which, in the preferred form of the invention, can be rotated into any one of five angular positions. In one of these positions of the control shaft, the head is caused to rapid traverse, or move rapidly and continuously in a first direction; in a second position of the control shaft, the head is caused to move intermittently or continuously at a rate suitable for feeding, in the same direction; in a third position of the control shaft, the head is disengaged from the driving mechanism which gives it rapid traverse or feeding motion; in a fourth position of the control shaft, the head is caused to feed in an opposite direction to the first direction; and in a fifth position of the control shaft, the head is caused to rapid traverse in a direction opposite to the first direction.

The advantages of my invention are that fixed or slidable control levers may be fastened to or slidably engage with the shaft in such a manner that the movement of the head may be controlled from the moving head itself, from either end of the control shaft, or from any other desired position on the control shaft or on a shaft or other mechanism operatively connected with the control shaft.

Figure 6:
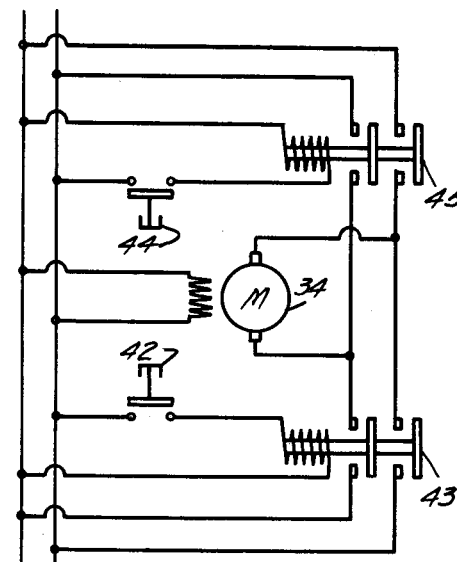
Figure 7:
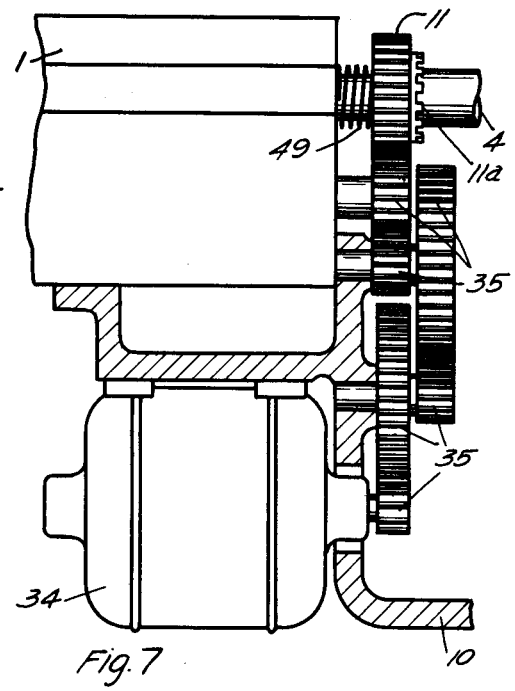
Figure 8:
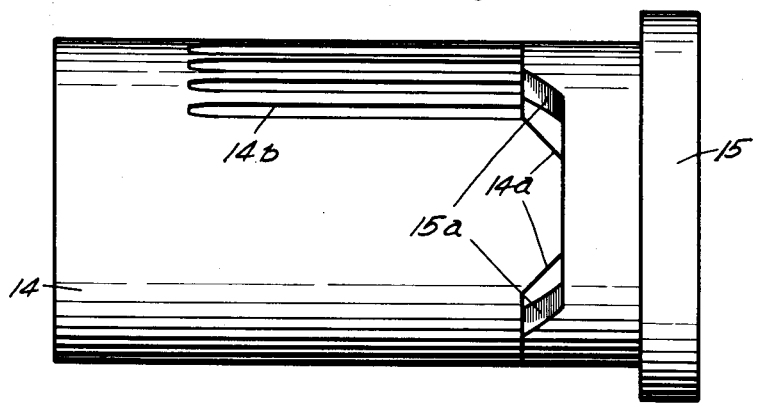
Figure 3:
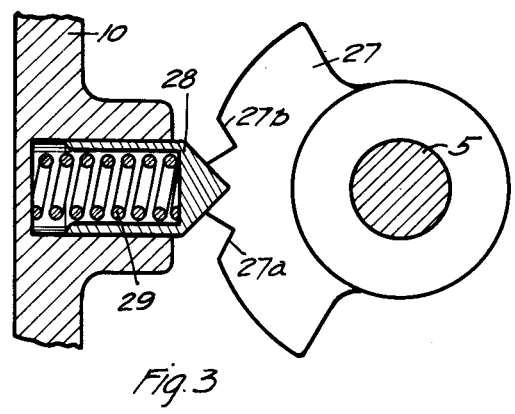

The mechanism by which I attain the desired object is illustrated in the following drawings, in which Figure 1 is a front view of a planer rail with two heads, and the box in which is contained the control mechanism at the end of the rail; Figure 2 is a view, partly in section, of the control mechanism taken in a direction perpendicular to a plane through the axes of the feed screw and its control shaft; Figure 3 is a partial section perpendicular to the axis of a control shaft, showing the disc and poppet for holding the control shaft in either of two feeding positions and in a neutral position; Figure 4 is a section through one of the sliding bars (bar 37), taken in a plane perpendicular to the axes of the control shafts, and showing a plurality of stub shafts and control shafts; Figure 5 is a partial section showing a view of the two sliding bars, and their associated pins, springs and push buttons; Figure 6 is a diagram of the circuit controlling the rapid traverse motor; Figure 7 shows one of the methods possible for driving the rapid traverse clutch gears by means of a reversible motor, and Figure 8 shows a view of the rapid traverse clutch shifting cams.

In the drawings 1 is a cross rail, to which is slidably gibbed saddle 2, to which is fastened a nut not shown, in which rotates screw 4. Screw 4 is prevented from moving axially, and hence when it revolves saddle 2 moves along the rail, the direction of motion depending on the direction of rotation of the screw. Parallel with screw 4 is control shaft 5 to which are fastened at each end handles 6 and 7 for the purpose of rotating the shaft into any one of five positions. Shaft 5 is splined or keywayed, or may have any suitable uniform cross section, and is fixed longitudinally so that while it may be caused to rotate about its axis to any desired angular position, it cannot move in a direction parallel to its axis by any appreciable amount. A slight axial movement, while permissible, has nothing whatever to do with its function. Attached to the saddle is guard 8 and slidably keyed to the control shaft is handle 9 which is caused by the guard to move longitudinally along the control shaft with the motion of the saddle. To the end of the rail is fastened gear box 10, into which screw 4 projects, and through which control shaft 5 passes. Box 10 may be made in parts bolted together in order to facilitate assembly. Rapid traverse gear 11, having on the side of it clutch teeth 11a, is rotatably mounted on the extension of screw 4. Splined to the extension of screw 4 is clutch 12 on which are clutch teeth 12a adapted to engage with and be driven by clutch teeth 11a. Concentric with the extension of screw 4 is spring 13, which presses clutch 12 away from gear 11 so that the teeth do not normally engage. Concentric with clutch 12 is a cylindrical cam member 14 having cam faces 14a adapted to engage with co-acting cam faces 15a cut on gland shaped bearing 15, which is fastened to a web in box 10. On the exterior surface of cam member 14 are cut gear teeth 14b which mesh with the teeth of sector 16 which is fast on control shaft 5. On the splined end of clutch 12 are cut a second and similar set of clutch teeth which normally engage with mating clutch teeth cut on clutch 17 which is fastened to stub shaft 18 which is co-axial with screw 4. Stub shaft 18 is splined and on it slides clutch 19 having cut on either end clutch teeth 19a and 19b. Clutch teeth 19a may be made to engage with clutch teeth 20a cut on feed gear 20, while clutch teeth 19b may be made to engage with clutch teeth 21a cut on feed gear 21. Feed gears 20 and 21 simultaneously rotate through a suitable angle, one clockwise and the other counter-clockwise, at intervals, while the planer is in operation. If this mechanism is used as a feed mechanism for those types of tools which have a continuous and not an intermittent feed, they will revolve continuously at a suitable rate in opposite directions while the machine is in operation. The mechanism whereby this opposite rotation is obtained is already well known in the art, and is therefore not described.

Clutch 19 has turned in it a groove 19c into which sets the fork 22a of cam member 22 through which control shaft 5 passes, the shaft being rotatable in the cam member. On either end of cam member 22 are cut cam faces 22b and 22c engaging respectively with cam faces 23a and 24a cut on cams 23 and 24 which are fast on control shaft 5.

When control shaft 5 is in the mid position, with respect to rotation, cam member 22 holds clutch 19 in mid position so that its teeth do not engage with the clutch teeth of feed gears 20 or 21. If, however, control shaft 5 is caused to rotate in a clockwise direction if viewed from the right-hand end in Figures 1 or 2, cam 24 will force cam member 22 to the left, and its fork will force clutch 19 into engagement with gear 20. The rise of the cam faces is made such that full engagement of the co-acting teeth is secured just before shaft 5 is turned to the feeding position, and thereafter any further turning of the shaft in a clockwise direction does not move cam member 22. Gear 20 is both slidably and rotatably mounted on stub shaft 18, but is forced by spring 25 axially to the right and into engagement with clutch 19 when clutch 19 is forced to the left. Should the tops of the teeth of clutch 19 strike the tops of the teeth of gear 20, gear 20 will be forced back against spring 25 until it has rotated sufficiently so that the co-acting clutch teeth will engage, after which time gear 20 will drive clutch 19 which in turn drives stub shaft 18 to which is fastened clutch 17 which drives clutch 12, which is splined to screw 4. The rotation of screw 4 in the saddle nut will cause saddle 2 to execute its feeding motion along cross rail 1.

It is evident that when control shaft 5 is rotated into a feeding position in the manner described, sector 16 will cause cam member 14 to rotate. However, the co-acting cam faces 14a and 15a are so cut that there is lost motion between them, and they do not come into contact until shaft 5 is turned from the mid-position to the feed position. Should, however, control shaft 5 be turned still further, the rotation of cam member 14 by sector 16 will cause cam faces 14a to co-act with cam faces 15a on bearing 15, pushing clutch 12 out of engagement with clutch 17, and shortly after this disengagement, clutch 12 engages the clutch teeth on rapid traverse gear 11 so that when rapid traverse gear 11 rotates it will drive screw 4 by means of clutch 12. At the same time, since stub shaft 18 is now disengaged from clutch 12, it will not rotate except when feed gear 20 rotates. Should the clutch teeth on 12 not engage properly with the clutch teeth on 11, gear 11 will be pushed back against spring 49 until it has rotated sufficiently to enable the spring to push the clutch teeth into engagement.

In the case of planers and many other types of tools, it is often necessary not only to be able to feed the head in the direction of the axis of the screw, but also to feed the head at an angle to this direction. Accordingly, it is necessary to provide a swiveling member 30, commonly called a harp, so mounted on the face of the saddle 2 that it can be turned to any desired angle. To this swiveling member is gibbed a slide 31 carrying a tool 48, in the manner long common in the art. The slide 31 may be caused to move along the swiveling member 30 by means already well known in the art. The mechanism for moving the slide along the harp is commonly driven by a feed shaft 32 parallel to the screw 4. Feed shaft 32 is driven by mechanism exactly similar to that already described in the case of the rail screw 4. This mechanism is controlled by control shaft 33, which is parallel with rail screw 4, control shaft 5, and feed shaft 32.

It is customary on planers and some other types of machine tools, for purposes of adjustment, to turn the feed screw or feed shaft manually by means of a crank applied at the end of the screw or shaft. This is a construction old in the art and need not be described. The purpose of the stub shaft 18 and clutch 17 is to operatively separate the crank from the screw when the head is being rapid traversed, in order that the crank shall not be caused to rotate rapidly and thus become an object of danger to the operator at such a time. The crank is applied to the end of the stub shaft.

It will be noted from the drawings that when control shaft 5 was turned in a clockwise direction, forcing cam member 22 to the left, the bearing face of cam 23 moved along the co-acting bearing face of cam member 22, and that a suitable space is left between the inoperative surfaces of cam member 22 and cams 23 and 24, so that there is no interference between them, even though the control shaft be turned a considerable angular distance.

If control shaft 5 be turned in a counter-clockwise direction, cam 23 will act on cam member 22 forcing it to the right, which in turn forces feed clutch 19 into engagement with feed gear 21 thus causing the head to feed in the opposite direction from that which it will feed if control shaft 5 is rotated clockwise into the feeding position.

If control shaft 5 is rotated counter-clockwise past the feeding position, cam member 14 will be caused to rotate in such a manner as to again force clutch 12 into engagement with the clutch teeth of gear 11.

It will be noted from the drawings and the description that when the control shaft is in its mid position, both the feed clutch and rapid traverse clutch are disengaged and it is impossible to impart power to the screw from any of the clutch gears. In order that the control shaft may be held in this position, there is fastened to it a disc 27, on the periphery of which are cut three notches. Poppet 28 is forced by spring 29 against the disc and will therefore engage one of the three notches when the control shaft 5 is in a suitable angular position. When poppet 28 engages the middle notch, the mechanism is in the position shown, and both clutches are disengaged from the driving gears. When the control shaft 5 is turned in a clockwise direction until the poppet engages notch 27a, feed clutch 19 engages with feed gear 20. In order to reverse the feed, control shaft 5 is turned in a counter-clockwise direction until poppet 28 engages notch 27b in which case feed clutch 19 engages feed gear 21. By the use of the poppet and notched disc, the control shaft is caused to stay in the mid position.

or in either feed position, as desired. When the control shaft is rotated past the feeding position in either direction, rapid traverse clutch 12 is caused to disengage from clutch 17 and on further motion to engage with clutch gear 11 in the manner already described.

It now becomes necessary to describe the method by which the rapid traverse gear 11 is caused to rotate in the proper direction when handle 6, 7 or 9 is turned to either end of its extreme positions. Referring to Figure 7 a motor 34 is placed on some part of the planer and by means of transmission mechanism, represented in the figure by a train of gears 35, the motor rotates clutch gear 11 whenever rapid traverse is desired. The motor is reversible and control is effected in the following manner:

Slidable in gear case 10 are two bars 36 and 37. Bar 36 is forced by spring 38 in a downward direction, while bar 37 is forced by spring 39 in an upward direction. Directly opposite control shafts 5 and 33 on bar 36 are pins 36a and 36b. In the same manner on bar 37 are corresponding pins 37a and 37b. On control shaft 5 are fastened two arms 40 and 41, one opposite bar 36, while the other is opposite bar 37. It will be noted from Figure 4 that arm 40 must be rotated in a counter-clockwise direction past the feeding position before it strikes the pin 36a while arm 41 must be rotated in a clockwise direction past the feeding position before it strikes pin 37a. If the rotation continues counter-clockwise past the point where the arm 40 strikes the pin 36a, the bar 36 will be caused to move, compressing spring 38 and causing the end of the bar to come into contact with push button 42. This closes a circuit which actuates the relay 43 in an electro-magnetic controller in such a manner as to cause the motor 34 to revolve in the proper direction to turn the screw in the same way as it is turned by the feed mechanism when the control shaft is turned counter-clockwise into the feeding position. In the same way, if control shaft 5 is turned clockwise into the rapid traverse position, arm 41 will strike pin 37a in bar 37, and upon further movement will cause the bar to touch push button 44 which will energize relay 45 of the electro-magnetic controller, causing the motor to revolve in the opposite direction to that in which it revolves when relay 43 is energized.

On control shaft 33 are two arms 46 and 47 similar to the arms 40 and 41 on control shaft 5. Arm 46 engages pin 36b when control shaft 33 is turned in a counter-clockwise direction and arm 47 engages pin 37b when control shaft 33 is turned in a clockwise direction. Thus, either control shaft may be caused to move either of the bars and thus energize the motor so as to cause it to revolve in the desired direction. By this system of mechanism, one control shaft may be in the neutral or either feeding position, and the other control shaft in the neutral or either feeding position or in either rapid traverse position. Additional pins may be added to the bars and additional control shafts and associated mechanism may be added if it is desired to control a plurality of heads. In the drawings the addition of a suffix X to a number indicates that the part is associated with the second head and performs the same function as the part having the number without the suffix X.

It is obvious in the case of the mechanism described, that for each screw or feed shaft it is necessary to have a reversible clutch gear for imparting rapid traverse and two clutch gears revolving in opposite directions for the purpose of imparting the feeding motion in one direction or the other. In order to make a compact and simple mechanism, it is preferable that the various feed screws and feed shafts lie in the same plane and that the various clutch gears mesh with the corresponding clutch gears on the adjacent shafts or screws. By suitably arranging the hand of the helix of the cam member 22, and the actuating cams 23 and 24, a clockwise rotation of the control shaft may be made to shift the feed clutch 19 in whichever direction is desired. In the same way, by properly arranging the positions of the arms 36 and 41 on the control shaft, clockwise rotation of the control shaft can cause relay 43 or 45 to be energized. By taking advantage of these facts, it is possible to arrange so that clockwise rotation of the appropriate control shaft will give the same motion to each of the heads, irrespective of the manner in which the clutch gears mesh with one another.

It will be understood by those familiar with the art that the clutch gears which give the feeding motion to the feed shafts or screws are driven in the same manner as such gears are commonly driven in similar machines. For instance, in a planer the clutch gears 20 and 21 may be driven from a ratchet mechanism and friction, or from any other equivalent mechanism now used or which may be used for driving the feed rods and screws of a planer for the purpose of feeding the heads. In the case of other machines not reciprocating in the nature of their action, the motion of the cutting tool or of the work, as the case may be, may be transferred by suitable power transmission mechanism including change gears, in the manner now common, to the feed gears 20 and 21.

Furthermore, the members 4 or 32 may be any rotating element adapted to transmit the feeding or rapid traverse movement to the part to be moved, by any form of mechanism suitable to the particular type of machine in which it is employed. Other forms of mechanism may be substituted for the clutch gears and toothed clutches shown, other devices may be substituted for the cams and cam members, and the three clutch gears may be driven from a common source of power, or from separate sources of power, hence the clutch gears may be regarded as power means for driving a head moving mechanism, the clutches as any equivalent form of operative connection, and the method of reversing a rapid traverse motor as the equivalent of a mechanically operated reversing mechanism, or an electro-magnetically operated mechanical reversing mechanism. Consequently, a number of different methods of operation and of application of my feed and rapid traverse control, to different types of machine tools, will readily suggest themselves to anyone familiar with the design of such machines.

In certain special types of machine tools, it is only necessary to feed the tool or the work in one direction and to rapid traverse it back to its original position, after the completion of the tooling operation, in which case it is unnecessary to provide all the mechanism described, but only sufficient to give a feed in one direction, and rapid traverse in one or both directions. Also it is obvious to those familiar with the art of machine tool design that the general features of the design may be readily adapted to those machines in which the work is fed instead of the tool. Accordingly, when the work is fed, the work holding element is the equivalent of the head previously described.

I claim as my invention:

1. In a machine of the type specified, a guide member, a head slidably mounted thereon, mechanism adapted to move the head along the guide member, a first power means adapted to drive the head moving mechanism continuously, a second power means adapted to drive the head moving mechanism intermittently, and rotatable control means, including a shaft manually operable at the head, adapted when in one position to operatively connect the first power means with the head moving mechanism, and when in a second position to operatively connect the second power means with the head moving mechanism.

2. In a machine of the type specified, a guide member, a head slidably mounted thereon, mechanism adapted to move the head along the guide member, a first reversible power means adapted to drive the head moving mechanism, a second power means adapted to drive the head moving mechanism in one direction, a third power means adapted to drive the head moving mechanism in the opposite direction, a rotatable control means including a longitudinally fixed rotatable member of uniform cross section adapted when in a first position to operatively connect the first reversible power means with the head moving mechanism, when in a second position to operatively connect the second power means with the head moving mechanism, when in a third position to operatively connect the third power means with the head moving mechanism, and when in a fourth position to again operatively connect the first reversible power means with the head moving mechanism, and means operatively connected with the rotatable control means for reversing the first reversible power means.

3. In a machine of the type specified, a guide member, a head slidably mounted thereon, mechanism adapted to move the head along the guide member, a first power means adapted to drive the head moving mechanism continuously, a second power means adapted to drive the head moving mechanism intermittently, a first clutch means for operatively connecting the first power means with the head moving mechanism, a second clutch means for operatively connecting the second power means with the head moving mechanism, and rotatable control means, including a shaft operable at the head, adapted when in one position to actuate the first clutch means and when in a second position to actuate the second clutch means.

4. In a machine of the type specified, a guide member, a head slidably mounted thereon, a screw adapted to move the head along the guide member, a first clutch gear rotatably mounted on the screw, reversible power means for driving the first clutch gear, a first clutch member splined to the screw and adapted to engage the first clutch gear, a first cam member adapted by its rotation to move the first clutch member axially, a spring normally tending to hold the first clutch member out of engagement with the first clutch gear, a stub shaft co-axial with the screw, a clutch fast on the stub shaft and adapted to co-act with the first clutch member when the said clutch member is disengaged from the first clutch gear, a second clutch gear power driven in a first direction and rotatably mounted on the stub shaft, a second clutch member slidably mounted on the stub shaft, a third clutch gear power driven in a second and opposite direction and rotatably mounted on the stub shaft, a control shaft parallel with the screw, a second cam member adapted to shift the second clutch member alternatively into engagement with the second clutch gear or the third clutch gear, a first cam fast on the control shaft and adapted to move the second cam member so as to cause engagement of the second clutch member with the second clutch gear, a second cam fast on the control shaft and adapted to move the second cam member so as to cause the second clutch member to engage with the third clutch gear, a member fast on the control shaft adapted to actuate the first cam member, and means actuated by the control shaft for reversing the reversible power means for driving the first clutch gear.

5. In a machine of the type specified, a guide member, a head slidably mounted thereon, a screw adapted to move the head along the guide member, a first clutch gear rotatably mounted on the screw, reversible power means for driving the first clutch gear, a first clutch member splined to the screw and adapted to engage the first clutch gear, a first cam member adapted by its rotation to move the first clutch member axially, a spring normally tending to hold the first clutch member out of engagement with the first clutch gear, a stub shaft co-axial with the screw, a clutch fast on the stub shaft and adapted to co-act with the first clutch member when the said clutch member is disengaged from the first clutch gear, a second clutch gear power driven in a first direction and rotatably mounted on the stub shaft, a second clutch member slidably mounted on the stub shaft, a third clutch gear power driven in a second and opposite direction and rotatably mounted on the stub shaft, a control shaft parallel with the screw, a second cam member adapted to shift the second clutch member alternatively into engagement with the second clutch gear or the third clutch gear, a first cam fast on the control shaft adapted to move the second cam member so as to cause the engagement of the second clutch member with the second clutch gear, a second cam fast on the control shaft adapted to move the second cam member so as to cause the second clutch member to engage with the third clutch gear, a member fast on the control shaft adapted to actuate the first cam member, means actuated by the control shaft for reversing the reversible power means for driving the first clutch gear, a handle adapted to rotate the control shaft, and poppet means for holding the control shaft in such angular positions that the second clutch member is in engagement with the second clutch gear, or with the third clutch gear, or disengaged from both.

6. In a machine of the type specified, a guide member, a head slidably mounted thereon, a rotatable element adapted to move the head along the guide member, a first clutch gear rotatably mounted, reversible power means for driving the first clutch gear, a first clutch member adapted to drive the rotatable element and to engage the first clutch gear, a first cam member adapted to move the first clutch member axially, a spring adapted to cause the first clutch member to move axially in the opposite direction, a second clutch gear rotatably mounted and power driven, a second clutch member adapted to drive the rotatable element and slidably mounted, a third clutch gear rotatably mounted and power driven in a direction opposite to that of the second clutch gear, a control shaft, a second cam member adapted to shift the second clutch member alternatively into engagement with the second clutch gear or the third clutch gear, a first cam fast on the control shaft adapted to move the second cam member so as to cause engagement of the second clutch member with the second clutch gear, a second cam fast on the control shaft adapted to move the second cam member so as to cause the second clutch member to engage with the third clutch gear, a member fast on the control shaft adapted to actuate the first cam member, and means actuated by the control shaft for reversing the reversible power means for driving the first clutch gear 7. In a machine of the type specified, a guide member, a head slidably mounted thereon, mechanism adapted to move the head along the guide member, a feed shaft adapted to drive the head moving mechanism, a first clutch gear rotatably mounted on the feed shaft, reversible power means for driving the first clutch gear, a first clutch member splined to the feed shaft and adapted to engage the first clutch gear, a first cam member adapted by its rotation to move the first clutch member axially, a spring normally tending to hold the first clutch member out of engagement with the first clutch gear, a stub shaft co-axial with the feed shaft, a clutch fast on the stub shaft and adapted to co-act with the first clutch member when the said clutch member is disengaged from the first clutch gear, a second clutch gear power driven and rotatably mounted on the stub shaft, a second clutch member slidably mounted on the stub shaft, a third clutch gear power driven in the opposite direction to the second clutch gear and rotatably mounted on the stub shaft, a control shaft parallel with the feed shaft, a second cam member adapted to shift the second clutch member alternatively into engagement with the second clutch gear or the third clutch gear, a first cam fast on the control shaft adapted to move the second cam member so as to cause engagement of the second clutch member with the second clutch gear, a second cam fast on the control shaft adapted to move the second cam member so as to cause the second clutch member to engage with the third clutch gear, a member fast on the control shaft adapted to actuate the first cam member, and means actuated by the control shaft for reversing the reversible power means for driving the first clutch gear.

8. In a machine of the type specified, a guide member, a head slidably mounted thereon, mechanism adapted to move the head along the guide member, a rotatable member adapted to drive the head moving mechanism, a first clutch gear rotatably mounted, reversible power means for driving the first clutch gear, a first clutch member adapted to drive the rotatable member and to engage the first clutch gear, a first cam member adapted to move the first clutch member axially, a spring adapted to cause the first clutch member to move axially in the opposite direction, a second clutch gear power driven and rotatably mounted, a second clutch member slidably mounted and adapted to drive the rotatable member, a third clutch gear power driven in the opposite direction to the second clutch gear and rotatably mounted, a control shaft, a second cam member adapted to shift the second clutch member alternatively into engagement with the second clutch gear or the third clutch gear, a first cam fast on the control shaft and adapted to move the second cam member so as to cause engagement of the second clutch member with the second clutch gear, a second cam fast on the control shaft and adapted to move the second cam member so as to cause the second clutch member to engage with the third clutch gear, a member fast on the control shaft adapted to actuate the first cam member, and means actuated by the control shaft for reversing the reversible power means for driving the first clutch gear.

9. In a planer, a guide member, a head slidably mounted thereon, mechanism adapted to move the head along the guide member, rotatable control means, a first clutch member axially shiftable and adapted to drive the head moving mechanism, a first clutch gear rotatably mounted and adapted to engage the first clutch member, means actuated by the rotation of the control means and adapted to shift the first clutch member axially, spring means adapted to shift the first clutch member axially in the opposite direction, reversible mechanism for driving the first clutch gear in either desired direction, a second clutch member axially shiftable and adapted to drive the head moving mechanism, a second clutch gear power driven, rotatably mounted, and adapted to engage one end of the second clutch member, a third clutch gear power driven in the opposite direction to the second clutch gear, rotatably mounted, and adapted to engage the opposite end of the second clutch member, means actuated by the rotation of the control means and adapted to shift the second clutch member alternatively into engagement with either the second clutch gear or the third clutch gear, and means actuated by the rotation of the control means, adapted to reverse the mechanism for driving the first clutch gear.

10. In a machine of the type specified, a guide member, a head slidably mounted thereon, mechanism adapted to move the head along the guide member, a first shaft adapted to drive the mechanism, a first clutch gear rotatably mounted on the first shaft, reversible power means for driving the first clutch gear, a first clutch member slidably mounted on the first shaft and adapted to engage the first clutch gear, a first cam member adapted to move the first clutch axially, a spring adapted to move the first clutch member axially in the opposite direction, a second clutch gear power driven, rotatably mounted, and co-axial with the first shaft, a second clutch member slidably mounted, co-axial with the first shaft, and adapted to drive the same, a third clutch gear power driven in an opposite direction to the second clutch gear, rotatably mounted, and co-axial with the first shaft, a second shaft parallel with the first shaft, a second cam member adapted to shift the second clutch member alternatively into engagement with the second clutch gear or the third clutch gear, a first cam fast on the second shaft and adapted to move the second cam member so as to cause the engagement of the second clutch member with the second clutch gear, a second cam fast on the second shaft and adapted to move the second cam member so as to cause the engagement of the second clutch member with the third clutch gear, a member fast on the second shaft and adapted to actuate the first cam member, means actuated by the second shaft for reversing the reversible power means for driving the first clutch gear, means for manually rotating the second shaft, and means for holding the second shaft in any one of three desired positions.

11. In a machine of the type specified, a guide member, a head slidably mounted thereon, mechanism adapted to move the head along the guide member, a first shaft adapted to drive the mechanism, a first clutch gear rotatably mounted on the first shaft, reversible power means for driving the first clutch gear, a first clutch member slidably mounted on the first shaft and adapted to engage the first clutch gear, a first cam member adapted to move the first clutch member axially, a spring adapted to move the first clutch gear axially in the opposite direction, a second clutch gear power driven rotatably mounted and co-axial with the first shaft, a second clutch member slidably mounted, co-axial with the first shaft, and adapted to drive the same, a third clutch gear power driven in the opposite direction to the second clutch gear, rotatably mounted, and co-axial with the first shaft, a second shaft parallel with the first shaft, a second cam member adapted to shift the second clutch member alternatively into engagement with the second clutch gear or the third clutch gear, a first cam fast on the second shaft and adapted to move the second cam member so as to cause the engagement of the second clutch member with the second clutch gear, a second cam fast on the second shaft and adapted to move the second cam member so as to cause the engagement of the second clutch member with the third clutch gear, a member fast on the second shaft adapted to actuate the first cam member, means actuated by the second shaft for reversing the reversible power means for driving the first clutch gear, means for manually rotating the second shaft, and means for holding the second shaft in such positions as will cause the second clutch member to engage with the second clutch gear or with the third clutch gear or with neither.

12. In a planer, a cutting tool, a head for carrying the same, a guide member on which the head is slidably mounted, means for moving the head along the guide member, a control shaft, a first clutch gear rotatably mounted, a first clutch member adapted to drive the head moving means, a first cam means adapted to shift the first clutch member, a spring adapted to shift the first clutch member, reversible means for driving the first clutch gear in either direction, a second clutch gear power driven and rotatably mounted, a second clutch member slidably mounted and adapted to drive the head moving means, a third clutch gear power driven in the opposite direction to the second clutch gear, and rotatably mounted, cam means actuated by the rotation of the control shaft and adapted to shift the second clutch member into engagement alternatively with either the second or third clutch gears, means actuated by the rotation of the control shaft adapted to actuate the first cam means, and means actuated by the rotation of the control shaft adapted to control the reversible means for driving the first clutch gear.

13. In a machine of the type specified, a guide member, a movable element slidably mounted thereon, mechanism adapted to move the said element along the guide member, a first reversible power means adapted to drive the said mechanism, a second power means adapted to drive the said mechanism in one direction, a third power means adapted to drive the said mechanism in the opposite direction, rotatable control means including a longitudinally fixed rotatable member of uniform cross section, means actuated by the rotation of the control means and adapted to operatively connect the first reversible power means with the said mechanism, means actuated by the rotation of the control means and adapted operatively to connect the said mechanism alternatively with the second power means or the third power means, and mechanism actuated by the rotation of the control means adapted to reverse the first reversible power means.

14. In a machine of the type specified, a plurality of heads for carrying tools, a plurality of mechanisms adapted to move the heads, a plurality of first clutch gears, one for each head moving mechanism, reversible power means for driving the first clutch gears, a plurality of first slidable clutch members each co-axial with and adapted to engage one of the first clutch gears and to drive the associated head moving mechanism, a plurality of first cam members, one for each of the first slidable clutch members, and each adapted to move its slidable clutch member axially, a plurality of springs, one for each of the first sliding clutch members and adapted to cause its clutch member to move axially, a plurality of power driven second clutch gears, one for each head moving mechanism, a plurality of second slidable clutch members, each co-axial with one of the second clutch gears and adapted to drive the associated head moving mechanism, a plurality of power driven third clutch gears, one for each of the second clutch gears, co-axial therewith, and driven in the opposite direction thereto, a plurality of rotatable control members, one for each head moving mechanism, a plurality of second cam members, one for each of the second slidable clutch members and each adapted to shift its slidable clutch member alternatively into engagement with the associated second or third clutch gear, a plurality of cam means, one for each control member, each actuated by the rotation of its control member and adapted to actuate the associated second cam member, a plurality of members, one for each control member, actuated by the rotation thereof and each adapted to actuate the associated first cam member, and means actuated by the rotation of any of the control members to one or the other of its extreme positions for reversing the reversible power means for driving the first clutch gears.

15. In a machine of the type specified, a head, mechanism adapted to move the head, a first power means adapted to drive the head moving mechanism at a rate suitable for rapid traverse, when operatively connected therewith, a second power means adapted to drive the head moving mechanism continuously or intermittently at a rate suitable for feeding, when operatively connected therewith, a first transmissive connection between the first power means and the head moving mechanism, a second transmissive connection between the second power means and the head moving mechanism, means for actuating the first transmissive connection, means for actuating the second transmissive connection, and rotatable control means including a longitudinally fixed rotatable member of uniform cross section adapted when in a first position to cause the means for actuating the first transmissive connection to operatively connect the first power means with the head moving mechanism, and when in a second position to cause the means for actuating the second transmissive connection to operatively connect the second power means with the head moving mechanism.

16. In a machine of the type specified, a head, mechanism adapted to move the head, a first reversible power means adapted to drive the head moving mechanism at a rate suitable for rapid traverse when operatively connected therewith, a first transmissive connection adapted to transmit motion from the first power means to the head moving mechanism, a second power means, a third power means, a second transmissive connection adapted to transmit motion alternatively from the second power means or the third power means to the head moving mechanism, means for actuating the first transmissive connection, means for actuating the second transmissive connection, rotatable control means including a longitudinally fixed rotatable member of uniform cross section adapted when in a first position to cause the means for actuating the first transmissive connection to operatively connect the first power means with the head moving mechanism, when in a second position to cause the means for actuating the second transmissive connection to operatively connect the second power means with the head moving mechanism, when in a third position to cause the means for actuating the second transmissive connection to operatively connect the third power means with the head moving mechanism, and when in a fourth position to cause the means for actuating the first transmissive connection to again operatively connect the first power means with the head moving mechanism, and means, operated by the rotatable control means, for reversing the first reversible power means.

17. In a machine of the type specified, a guide member, a head slidably mounted thereon, mechanism adapted to move the head along the guide member, a first reversible power means adapted to drive the head moving mechanism, a second power means adapted to drive the head moving mechanism, a first clutch means for operatively connecting the first power means with the head moving mechanism, a second clutch means for operatively connecting the second power means with the head moving mechanism, rotatable control means, including a longitudinally fixed rotatable member of uniform cross section adapted when in a first position to actuate the first clutch means, when rotated to a second position to actuate the second clutch means, and when rotated to a third position to again actuate the first clutch means, means operatively connected with the rotatable control means for reversing the first reversible power means, and manually operable means attached to the head for rotating the longitudinally fixed rotatable member.

18. In a machine of the type specified, a guide member, a movable element slidably mounted thereon, mechanism adapted to move the said element along the guide member, a first reversible power means adapted to drive the said mechanism at a rate suitable for rapid traverse, a second power means adapted to drive the said mechanism in one direction in a manner and at a rate suitable for feeding, a third power means adapted to drive the said mechanism in the opposite direction in a manner and at a rate suitable for feeding, rotatable control means, including a longitudinally fixed rotatable member, clutch means actuated by the rotation of the control means and adapted operatively to connect the first reversible power means with the said mechanism, a second clutch means actuated by the rotation of the control means and adapted operatively to connect the said mechanism alternatively with the second power means or the third power means, mechanism actuated by the rotation of the rotatable control means adapted to reverse the first reversible power means, and manually operable means for rotating the longitudinally fixed rotatable member.

FORREST E. CARDULLO.